Nov. 10, 1936.    R. SCHEYNOST    2,060,126
COMMINUTING MACHINE
Filed Jan. 23, 1935    3 Sheets-Sheet 1
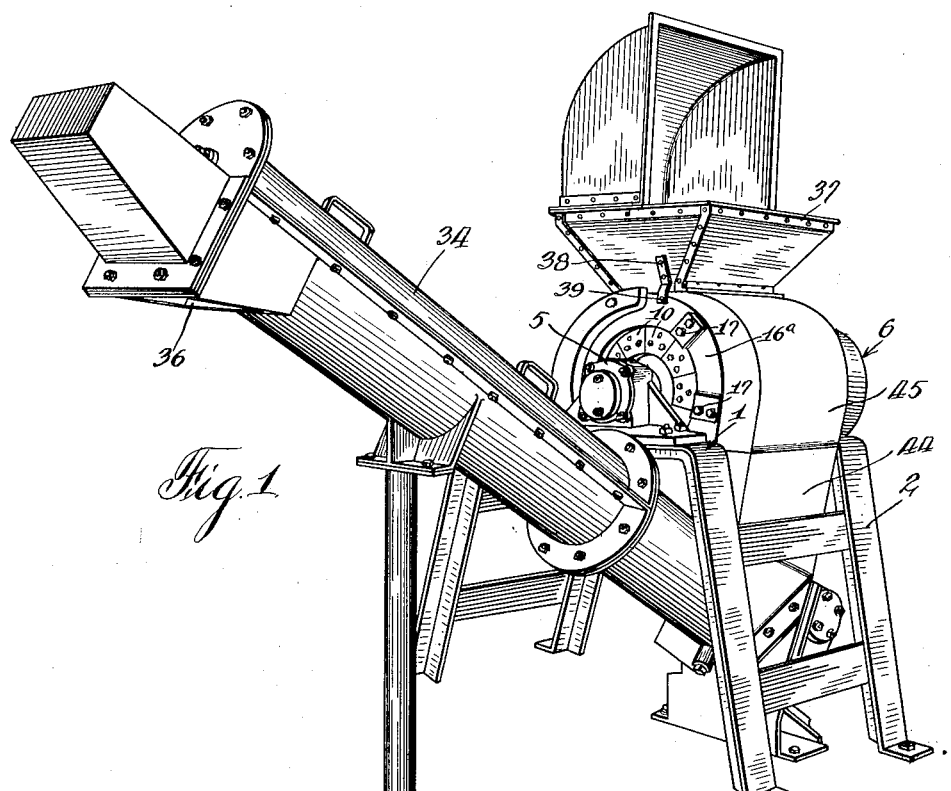
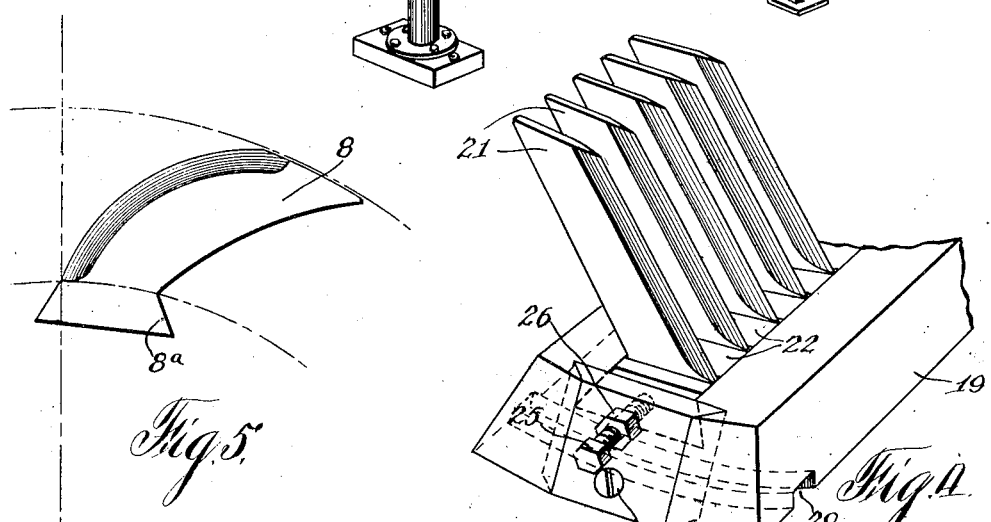

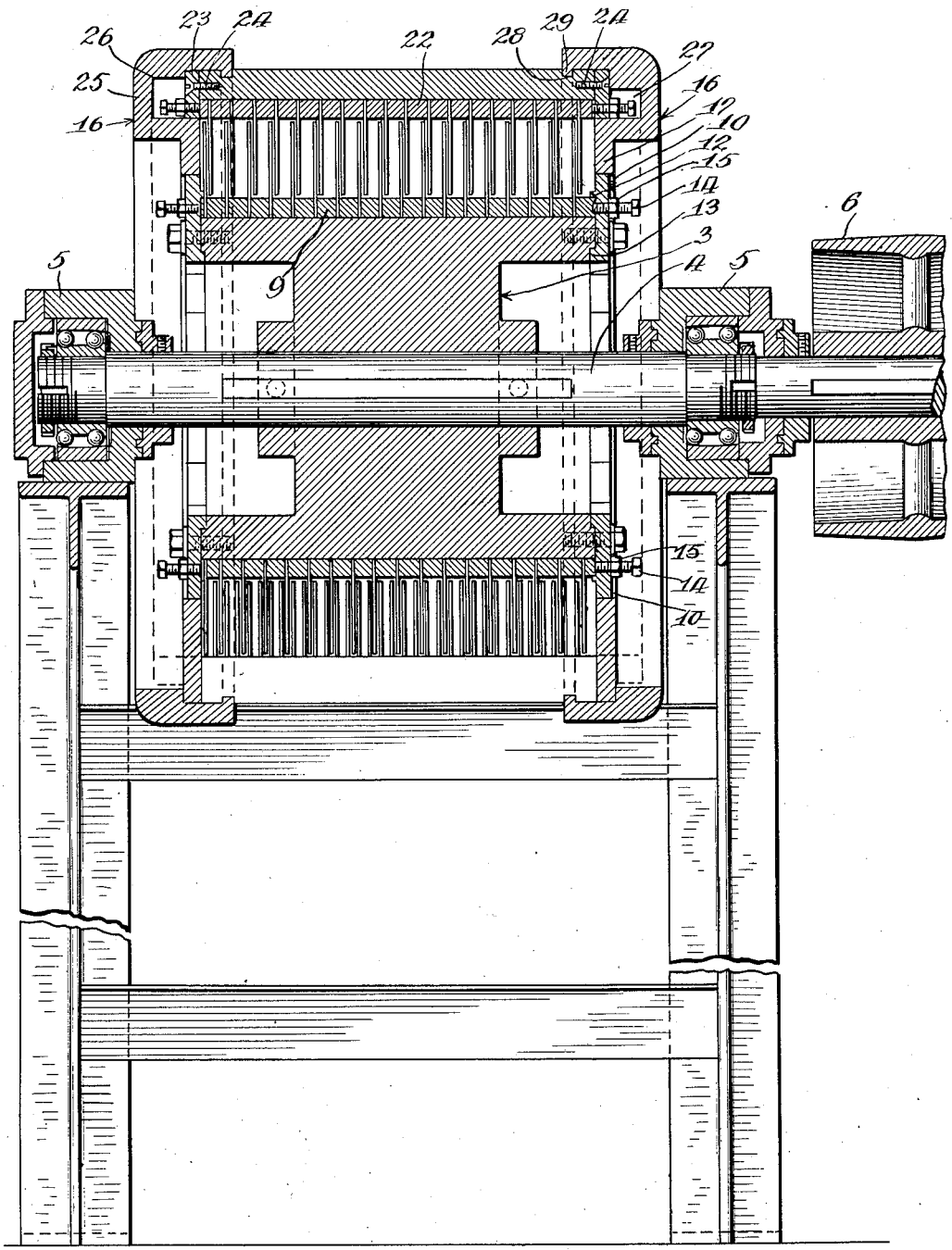

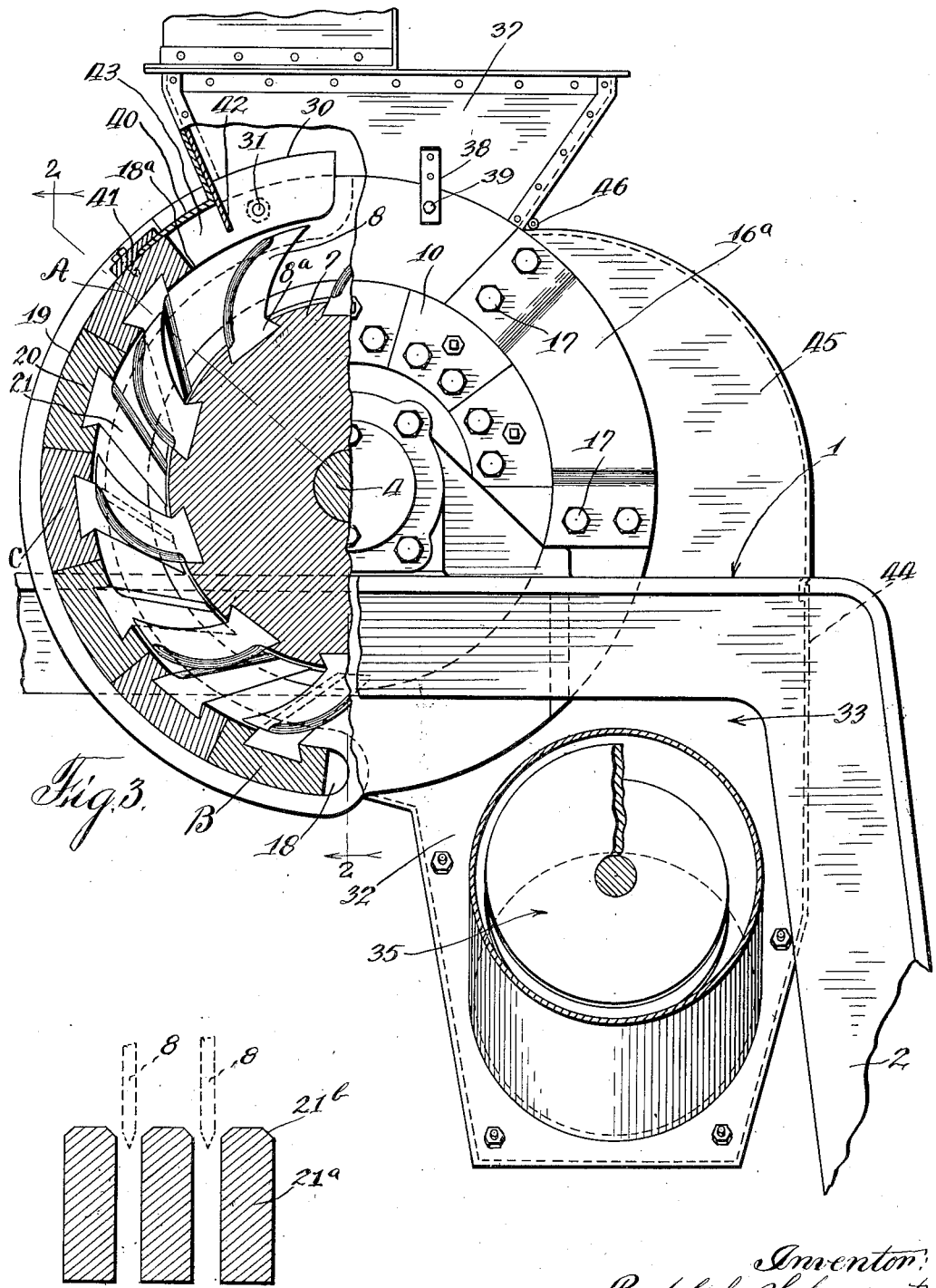

Patented Nov. 10, 1936

2,060,126

UNITED STATES PATENT OFFICE 2,060,126

COMMINUTING MACHINE

Rudolph Scheynost, Chicago, Ill.

Application January 23, 1935, Serial No. 3,080

5 Claims. (Cl. 146—123)

This invention relates to comminuting machines and more particularly to machines used in the preparation of meat for sausage.

It is an object of the present invention to provide a comminuting machine which may be operated at high speed for quantity production and in which the comminuting members or cutters are so disposed that the meat will be completely comminuted during its passage through the machine and small bones which may be inserted with the meat will be efficiently separated therefrom and will not be carried through the machine.

A further object is to provide a machine of the character described in which the knives or comminuting members may be accurately adjusted relative to each other and in which they may be easily removed from the machine for sharpening or renewal and may be easily replaced without disassembling the machine and may be rigidly secured in adjusted relation.

Another object is to provide a machine of simple construction which is easy to assemble and which will not easily get out of order and in which all parts are easily accessible for cleaning repair, or adjustment.

Further objects will be apparent from the specification and the appended claims.

In the drawings:

Figure 1 is a perspective view of one embodiment of the completely assembled machine.

Fig. 2 is an axial section through the machine and taken on a line corresponding to line 2—2 of Fig. 3.

Fig. 3 is a front elevation of the embodiment illustrated in Fig. 2, a portion being shown in section.

Fig. 4 is a perspective view of one end of one of the removable knife sections or units.

Fig. 5 is a side elevation of one of the rotor cutters and illustrates the relation of the curved cutting edge to the rotor and casing.

Fig. 6 is a somewhat diagrammatic cross section through a set of blades which may be interchangeable with the sharpened blades illustrated in Fig. 3.

Referring to the drawings in detail the embodiment illustrated comprises a frame 1 provided with suitable legs 2. A rotor 3 is secured to a horizontal shaft 4 which latter is mounted in suitable bearings 5 on the frame 1. The shaft 4 and rotor 3 thereon may be driven at relatively high speed by means of any suitable power source operatively connected to a pulley 6 on the shaft 4 or a direct motor drive may be used. The rotor 3 is provided with a plurality of longitudinal circumferentially spaced dovetail slots 7, each slot having a plurality of outwardly extending curved knives 8 slidably mounted therein. The inner ends 8a of the knives are shaped to fit the dovetail slot 7 and are supported and clamped therein by means of spacing blocks 9 which are also slidably mounted in the slot. Segments 10 are secured to each end of the rotor and in a position to close the ends of each dovetail slot 7. The segments 10 are secured to the rotor by means of screws 11 and are provided with inwardly extending ribs 12 and 13 which engage the rotor as illustrated to assist in preventing their displacement during operation of the machine. The segments when assembled, provide an outwardly extending flange-like segmental ring or flange at each end of the rotor. Adjusting screws 14 are threaded in the segments 10 and in alignment with the dovetail slot 7. These adjusting screws are provided with lock nuts 15 and their inner ends bear against one of the spacing blocks or members 9 which space the blades 8 in the dovetail slots.

It will be apparent that by suitable adjustment of the screws 14 each entire series or row of knives 8 may be adjusted longitudinally of the rotor by a suitable adjustment of the screws, and, after they are properly adjusted, they may be securely locked in place by means of the lock nuts 15. This arrangement provides a unit comprising the rotor member 3 and radially disposed rows of blades thereon in which the blades of any longitudinal row may be accurately adjusted and securely clamped in place.

A ring-like casing or side member 16 is mounted on the frame adjacent each end of the rotor 3 and each member is provided with an inwardly extending flange 17 which is closely adjacent the outer edge of the segmental members 10 whereby the space between the members is substantially completely closed and the rotor is permitted to rotate freely therein. The side members 16 are provided with removable segments 16a which are secured in place by screws 17 and which may be removed to provide access to any of the rotor cutters. The side members 16 are also provided with oppositely disposed arcuate slots 18 which are open at their upper ends as indicated by the reference character 18a.

Longitudinal arcuate members 19 are slidably and removably mounted in the slots 18 as illustrated in Fig. 3. Each of the arcuate members 19 are provided with longitudinal dovetail slots 20 in which are mounted suitable inwardly extending angularly positioned knives or cutters 21 for cooperation with the knives 8 on the rotor 3. Spacing blocks 22 are arranged to slidably fit the dovetail slots 20 and are positioned between the knives 21, as illustrated particularly in Fig. 2. The arcuate members 19 are radially dovetailed at each end and members 23 are mounted in the radial dovetails and secured therein by means of screws 24 as illustrated in Fig. 4. These end members 24 cover the ends of the dovetail slots 20 and are provided with adjusting screws 25 bearing against the spacing members 27 and having lock nuts 26 thereon. The adjusting screws and lock nuts serve to adjust and lock in place the angular knives 21 in the same manner that the adjusting screws 14 adjust and secure the curved knives 8 in the rotor 3.

The ring-like casing members 16 are provided with outwardly extending arcuate grooves 27 which provide clearance for the adjusting screws 25. The knife-supporting members 19 are provided with aligned slots 28 adjacent their ends which cooperate with an inwardly extending flange 29 on the side members 16 whereby the members 19 are more accurately guided and supported in the slots 18. The arcuate knife-carrying members 19 may be placed in the open end 18a of the slots or grooves 18 and resting on the lower shoulder thereof, and they may then slide downwardly into the position illustrated in Fig. 3. By this means, it will be apparent that each section including a dovetail base 19 and angular knives 21 may be easily inserted or removed. Small removable blocks or slot-closing members 30 may be inserted in the open ends of the arcuate slots 18 and retained by means of screws 31 whereby they may be easily removed for insertion or removal of the cutter units. The knife units, together with the ring-like side members 16 and the flanged rotor 3, provide a suitable closed casing through which the meat is passed during operation of the machine.

Only a comparatively few sets of inwardly extending angular knife units are required and these are preferably all mounted on one side of the axial vertical plane of the machine as illustrated in Fig. 3. The opposite side of the casing is therefore enlarged and provides an outlet at 32 adjacent the lower right hand side of the machine as illustrated in Fig. 3 whereby the comminuted meat may be thrown outwardly and away from the rotor knives.

An outwardly extending casing portion 33 is provided on that side of the machine opposite the angular casing knives and this portion extends somewhat beyond the path of the rotor knives whereby there will be no tendency to carry the meat around with the rotor.

As illustrated in Fig. 1, a conveyor is provided for removing the meat from the open side of the machine and comprises an elongated tubular member 34 in which is mounted a spiral screw conveyor 35, which latter is shown in section in Fig. 3. This conveyor may be driven from any suitable power source and removes the comminuted meat after it is discharged from the rotor and conveys it upwardly and discharges through a suitable opening 36 into any convenient receptacle. The comminuted meat will be thrown outwardly into the space provided by the enlarged portion of the casing and will drop downwardly to the conveyor.

The machine is provided with a hopper 37 through which the meat may be inserted into the cutting space between the rotor and outer casing. The hopper is preferably made of sheet metal and is removably secured to the side members 16 by means of overhanging straps 38 and screws 39. The hopper is also provided with a forwardly extending flange 40 which overlaps the upper knife holding base 19 and is removably retained by means of an elongated member 41 secured to the base by suitable screws. The flange 40 and the downwardly extending portion 42 of the hopper provide a pocket 43 in which small bones, which may be inadvertently inserted with the meat, will be thrown by the rotor blades 8 and from which they may be removed by reaching through the hopper when the rotor is stopped or the flange 40 may be hinged to the hopper.

The rotor blades 8 are so positioned, and the cutting edges are of such shape that substantially all small bones will be thrown into the pocket 43, and if a large bone is accidently inserted in the hopper, it will ordinarily be thrown completely out of the hopper opening with no tendency to enter the pocket. It is sometimes desirable to sharpen the outer ends of the rotor blades as well as the arcuate edges.

The outwardly extending casing portion 33 is preferably made in two sections comprising a lower section 44 which is secured to the frame and an upper section 45 which is preferably hinged to the hopper at 46. By this arrangement the section 45 may be raised, if desired, to provide access to the interior of the machine when necessary and as the side member segments 16a are easily removable the rotor knives are always easily accessible without removing the hopper.

It will be apparent that the cutter spacing blocks 9 and 22 may be of any suitable width whereby the various knives may be spaced in a desired relation for either fine or coarse cutting. In the present embodiment the inwardly extending angular knives 21, in the upper section A as illustrated in Fig. 3, are spaced eleven-sixteenths inch apart and the knives in the lower section B are spaced five-sixteenths inch apart. If still finer cutting is desired, the knives of one of the inner intermediate sections, such as C, may also be spaced closer together. It will also be apparent that by various adjustments and positioning of the knife sections, almost any desired degree of fineness or coarseness may be obtained in the final product.

All of the cutters mounted on the rotor may be adjusted longitudinally by means of the adjusting screws 14 and without removing any part of the mechanism. The casing knife sections 19 may easily be removed by removing the hopper and blocks 30, lifting the sections upwardly in the slot 18.

The knives may be easily adjusted in the base 19 by means of the screws 25 or they may be removed for sharpening or replacement by removing one of the end plates 23. The present invention provides an extremely simple machine in which any one or more of the knives on either the rotor or the casing may be easily removed and replaced or adjusted.

Fig. 6 is a cross sectional view through a set of blade members 21a which are interchangeable with the knives 21 on the casing. The blades 21a are positioned very close together in the base 19, suitable thin spacing blocks being provided for the purpose. The rotor blades 8 are indicated by dotted lines. The front corners 21b of the thick blades are preferably beveled as shown. In operation, the meat piles up against the comb-like assembly and is gradually fed into the spaces 21a where it is finely cut by the rotor blades.

It will be understood that the cutters may be so spaced that alternate rows of rotor cutters may pass on opposite sides of the casing blades. Also, the blocks 19 may be built-up units if desired instead of being formed from a single piece of metal.

Modifications may be made in the embodiment herein illustrated and described and it is desired therefore that the invention be limited only by the prior art and the appended claims.

Having thus described this invention, what is claimed and desired to be secured by Letters Patent is:

1. A comminuting machine of the character described comprising a rotor having a plurality of sets of outwardly extending knives thereon, a frame having arcuate slots therein, a plurality of units removably supported in said slots for free removal from and insertion therein and having inwardly extending knives for cooperation with said rotor knives, means for longitudinally adjusting each set of knives in said rotor, and means on said units for longitudinally adjusting the knives thereon.

2. A removable cutter unit for a machine of the character described comprising an elongated base having an arcuate inner face with a longitudinal dovetail slot therethrough and vertical dovetail slots in the ends of said base, alternate cutters and spacing blocks in said longitudinal slot and conforming thereto, end members in said end slots and overlapping said longitudinal slot, and adjusting screws in said end members and bearing against said spacing blocks whereby all of the blocks and cutters may be simultaneously adjusted and secured in adjusted position.

3. A meat comminuting machine comprising a rotor, cutters longitudinally adjustable on said rotor, a ring on said rotor and comprising removable segments forming an outwardly extending flange, each segment in substantial alignment with associated cutters, means on said segments for adjusting said cutters, ring-like casing members in radial alignment with said flanges and having oppositely disposed arcuate slots therein, a plurality of freely removable elongated casing members in said slots and interlocking in slidable relation with said rings, and inwardly extending cutters longitudinally adjustable on said casing members.

4. A meat comminuting machine comprising a rotor, longitudinally adjustable cutters on said rotor, lateral flanges on said rotor and comprising removable segments secured thereto in substantial alignment with associated cutters, means accessible from outside said flanges to adjust said cutters, ring-like members cooperating with said flanges to form a closed casing and having open top arcuate grooves to receive cutter units, a plurality of freely removable cutter units in said grooves to provide a closed casing, said ring-like members and said units being provided with interlocking portions adapted to prevent spreading of the members.

5. A machine of the character described comprising a rotor and casing having outwardly and inwardly extending co-operative knives respectively, said rotor knives being mounted in longitudinally adjustable rows on said rotor, outwardly extending flanges on said rotor, inwardly extending flanges on said casing, said flanges co-operating to enclose said knives, said rotor flanges comprising removable segment-like members in alignment with corresponding rows of knives, means for interlocking said flanges with said rotor to resist centrifugal force, and means on said segments for longitudinally adjusting the corresponding rows of knives.

RUDOLPH SCHEYNOST.